Aug. 7, 1928.
L. M. CRANS
1,679,962
BLOW-OUT PREVENTER
Filed Jan. 18, 1927  2 Sheets-Sheet 1
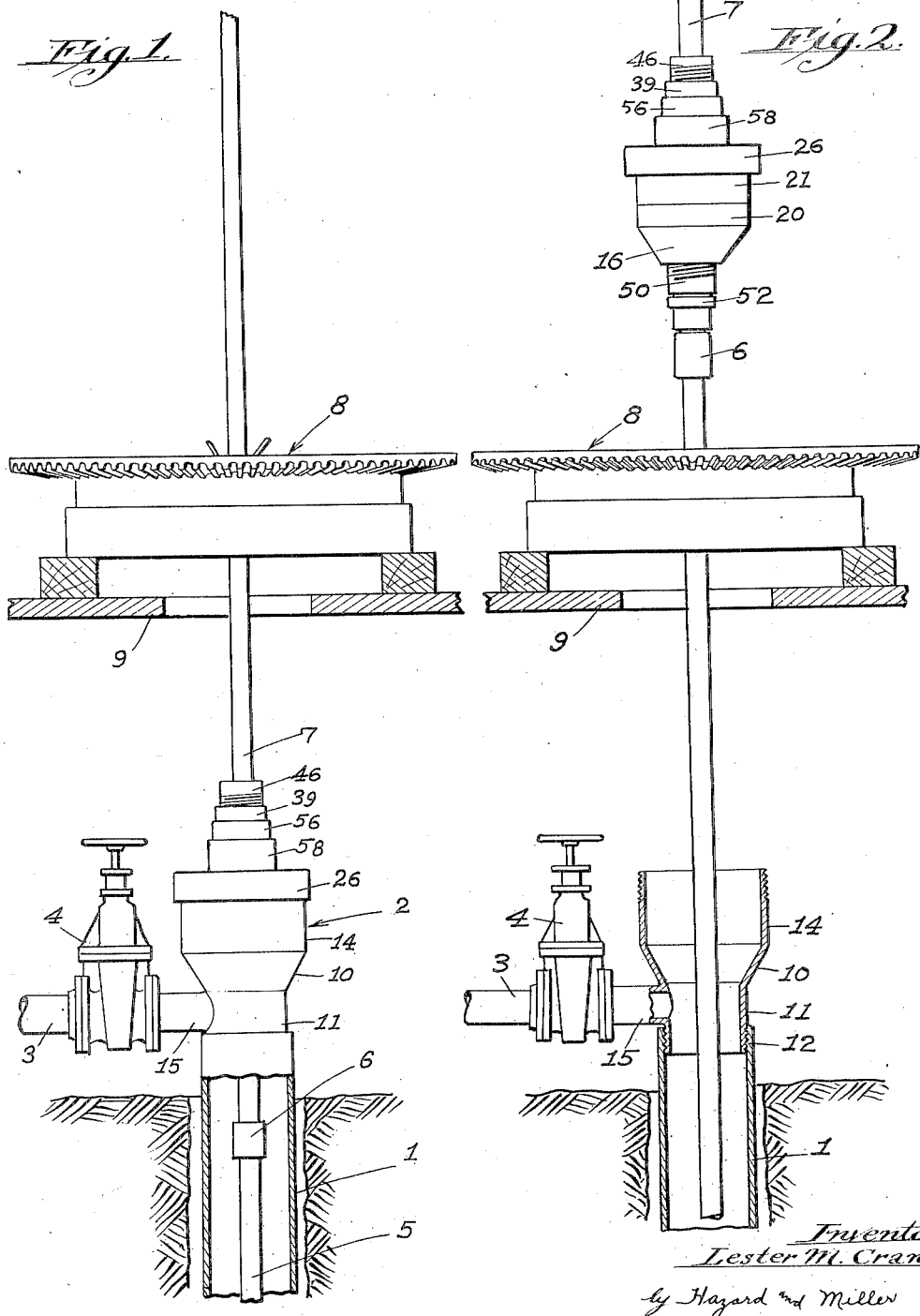

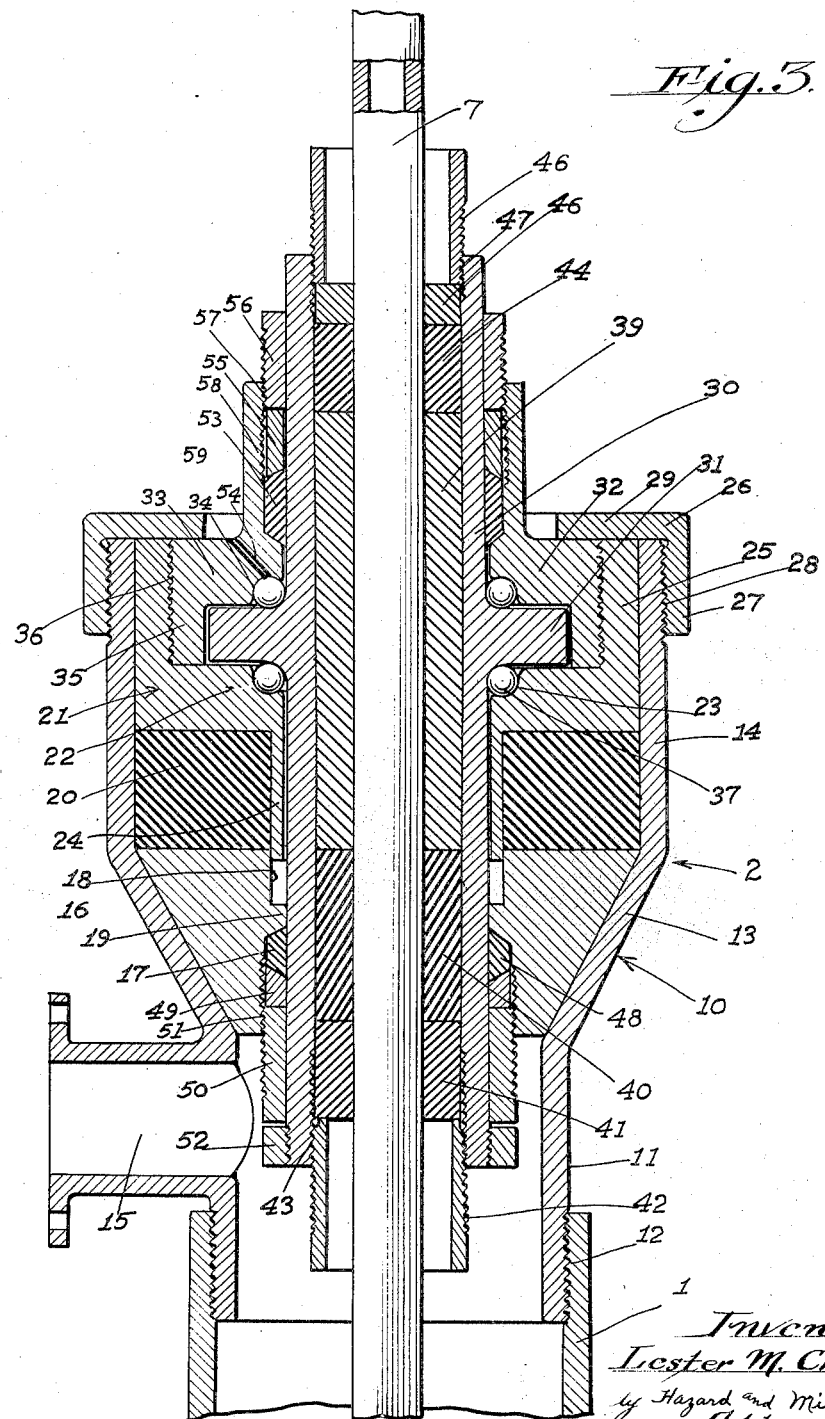

Patented Aug. 7, 1928.

1,679,962

UNITED STATES PATENT OFFICE.

LESTER M. CRANS, OF VENICE, CALIFORNIA.

BLOW-OUT PREVENTER.

Application filed January 18, 1927. Serial No. 161,776.

My invention is a blow out preventer to be used in oil well drilling when using a rotary type of drill.

An object of my invention is the construction of a blow out preventer for use in drilling oil wells, using a rotary drilling rig, in which the drilling mechanism is allowed to rotate but will prevent the blow out of gas and oil through the top of the well.

A further object of my invention is the construction of a blow out preventer for rotary well drilling which may be connected to the top of a well casing and allow rotation as well as longitudinal movement of the drilling mechanism, such blow out preventer being constructed to be readily removable from the casing to allow withdrawing and insertion of the drilling tools.

A more specific object of my invention is the construction of a blow out preventer having a stationary part directly connected to the top of a well casing and with a rotary element arranged to allow the Kelley used in rotary well drilling to have rotary motion as well as a sliding motion through the device.

In constructing my invention I attach a cup like structure to the top of the casing, this structure preferably having an outlet for gas and oil at the side, and part of it being tapered, the upper part being cylindrical. A wedge shaped metal block having a circular opening in the center fits on the tapered part of the cup. Above this is a rubber packing ring and above the packing ring is an angular shaped sleeve having a flange fitting inside the rubber ring and having an internally threaded flange at the top, this sleeve forming a lower ball race for an antifriction structure. The angular sleeve is pressed into position by a clamping collar, this compressing the rubber and forming a tight seal with the cup and with the angular sleeve.

The square Kelley fits through a packing tube, allowing a sliding fit. This tube is fitted inside of a rotary sleeve, such sleeve having a flange with antifriction bearings below and above same, the upper bearing operating against an angular nut which is threaded into the angular collar. Suitable packing is fitted inside the rotary sleeve between the Kelley and such sleeve at the top and bottom, forming a sufficiently tight seal to prevent blow out at the Kelley or through the rotary sleeve. Packing is also inserted between the stationary part of the structure and the rotary sleeve, forming a gas and oil tight seal.

My invention will be more readily understood from the following description and drawings, in which:

Figure 1 is an elevation, partly broken away, showing the installation of my blow out preventer when in operative position and illustrating the rig for rotating the Kelley and hence the drilling tools.

Figure 2 is an elevation, partly in section, of the installation showing the internal parts of the blow out preventer removed and drawn through the rotary rig for withdrawing or inserting the drilling tools in the well casing.

Figure 3 is a vertical section through my blow out preventer.

Referring to Figs. 1 and 2, a well casing is designated by the numeral 1 having my blow out preventer, which is designated generally by the numeral 2, mounted on the casing. An outlet pipe 3, having a suitable valve 4, forms the outlet for the gas and oil. The drill rod 5 is illustrated in Fig. 1 as extending downwardly in the well, there being a coupling 6. The Kelley 7 is connected above the coupling, having a sliding movement through the internal parts of the preventer. The Kelley is rotated by the rotary drilling rig, designated generally by the numeral 8, mounted on the derrick floor 9. This rotary rig is of known construction.

The details of the blow out preventer are substantially as follows, having reference particularly to Fig. 3:

A cup like casing structure 10 has a lower tubular section 11 which, by means of threads 12, is connected to the casing. This structure has a conical section 13 and an upper cylindrical section 14. Preferably the outlet pipe 15 for oil and gas is connected to the cylindrical section 11 and connects to the valve 4, hence the pipe 3.

The stationary parts of the blow out preventer embody a conical shaped metal plug 16 which fits on the conical section 13 of the cup casing. This has a lower bore 17 and an upper bore 18 with an annular rib 19 separating the bores. A rubber or equivalent packer or packing ring 20 rests on top of the plug 16 and above this is an angular sleeve 21, this sleeve having a central portion 22 with a ball race 23 therein, and having a depending cylindrical section 24 against which the rubber packer fits. The upper flange 25 of the angular sleeve has a sliding fit in the upper cylindrical portion 14 of the cup casing. An angular collar 26 has a depending flange 27 with a screw threaded engagement 28 between the flange and the upper portion of the wall 14. A horizontal flange 29 bears against the upper part of the flange 25 and when the collar is screwed down the rubber packer is compressed, thus forming a tight seal between the cup casing and the sleeve 21.

The rotary structure is substantially as follows:

The Kelley, as above described, is usually square in external cross section and has a central bore through which a slushing fluid may be pumped. A rotary sleeve 30, having a flange 31, fits inside the angular sleeve 21 and is held therein by an angular nut 32, such nut having a central portion 33 with a ball race 34 therein, and having a depending flange 35, the flange and the outside of the central part having a screw threaded connection 36 with the inner surface of the flange 25 of the sleeve 21. Antifriction bearing elements, such as the balls 37, form a support for the flange 31 below and above same, the lower balls running in the race 23 and the upper in the race 34.

A tube 39 of packing material is fitted between the central portion of the rotary sleeve and the Kelley and below this is an expandible and resilient packing 40, there being a packing ring 41 below such packing. A packing nut 42 has a screw threaded engagement 43 with the interior surface of the lower end of the rotary sleeve. Another resilient packing 44 fits on top of the packing 39, there being a packing ring 45 above same and a packing nut 46 having a threaded connection 47 with the interior surface of the top of the rotary sleeve. These packings form a tight seal between the Kelley and the rotary sleeve, preventing any gas or liquid from blowing through. The packing may be adjusted to give the necessary sliding fit to accommodate the drilling operations.

The packing between the rotary sleeve and the stationary elements is substantially as follows:

A wedge shaped packing ring 48 is positioned outside of the rotary sleeve below the rib 19 of the plug 16 and a second packing ring 49 is positioned therebelow. An externally threaded packing nut 50 has a screw threaded engagement 51 with the lower bore 17 of the plug 16 and presses the packing rings 48 and 49. A keeper ring 52 retains the nut 50 in place. Above the ball bearings a packing ring 53 is fitted between the upper part of the rotary sleeve and a shoulder 54 on the angular nut 32. A second tapered surface packing ring 55 is positioned above the ring 53, these rings being compressed by a packing nut 56, having a threaded connection 57 with the internal threads on the upper extension 58 of the angular nut 32. These packings form a gas and liquid tight seal between the stationary parts of the blow out preventer and the rotary sleeve. In order to lubricate the anti-friction bearings, an oil duct 59 leads through the angular nut 32 to the upper ball bearing and hence forms an oil film around said bearings and between the rotary sleeve and the stationary elements outside of same.

The manner of use of my blow out preventer is substantially as follows:

Presuming the structure be assembled, as shown in Fig. 3, and connected to the well casing, as shown in Fig. 1, in which it is presumed to be driven by the drilling rig 8, this allows the Kelley to have free rotation and to move longitudinally in the drilling operation, and should there be a blow out in the well, it will be seen that there is a proper seal at the top so that the oil and gas may be checked by the valve 4 or exhausted therethrough at a rate which may control the well.

When it is desired to remove the drilling tools, the collar 26 is unscrewed, thus disengaging the internal parts of the blow out preventer from the cup casing head 10. Then all such parts, with the Kelley and the drill rod, may be elevated through the drilling rig 8, this being of a type to allow upward passage of these parts. It will thus be seen that I have provided a blow out preventer which may be easily attached to a well casing and may be readily removed and disconnected to allow removal of the drilling tools.

Various changes may be made in the principles of my invention without departing from the spirit thereof, as set forth in the description, drawings and claims.

I claim:

1. A blow out preventer comprising in combination a well casing, a casing head structure connected thereto, a plug, a first packing and a bearing element, in the casing head structure, a tubular sleeve having a bearing on the bearing structure, a rotatable rod extending through said sleeve, packing between the rod and the sleeve, and packing between the sleeve and the said plug, the first packing being between the plug, the bearing element and the casing structure.

2. A blow out preventer comprising in combination a well casing having a casing head structure with a tapered portion, a tapered plug therein, a rubber packing on the plug, a stationary bearing element above the packing, a rotatable sleeve having a flange, said flange having a bearing on the said bearing element, a rotatable rod, a packing between the rod and the sleeve, and a packing between the plug and the sleeve.

3. A blow out preventer comprising in combination a casing, a cup like casing head structure connected thereto, a plug, a first packing element and a bearing structure, mounted in the casing head, a tubular sleeve having a flange, an angular nut connected to the said bearing structure, antifriction bearings between the bearing structure, the flange and the said nut, a rotatable rod, and a packing between the rod and the rotatable sleeve, the first packing being between the plug, the bearing element and the casing structure.

4. A blow out preventer comprising in combination a casing, a cup like casing head structure having a tapered portion, a plug fitting therein, a packing ring on the plug, an angular bearing sleeve on the packing, one part of said sleeve fitting inside the packing ring, means connected to the casing head to compress the sleeve and hence the packing, a rotary sleeve having a flange, antifriction bearings between the angular sleeve and the flange, a packing nut threaded in the angular sleeve, antifriction bearings between the flange and said packing nut, a rotatable rod, a packing between the rod and the rotatable sleeve, and packing between the sleeve and the plug and the sleeve and the packing nut.

5. A blow out preventer comprising a cup like casing head adapted for attachment to a well casing, part of the casing head being tapered and the upper part cylindrical, a tapered plug fitting in the said tapered portion of the casing head, an angular sleeve fitted in the cylindrical portion and having a depending cylindrical section, a packing ring between the casing head and the cylindrical portion of the said sleeve, an angular collar threaded on the cylindrical portion of the casing head and bearing against the angular sleeve, thereby compressing the packing ring, a rotatable sleeve having a flange, an antifriction bearing between the flange and the angular sleeve, a packing nut threaded in the angular sleeve, an antifriction bearing between said nut and the flange, a rotatable rod, a packing between the rod and the rotatable sleeve, a packing between the rotatable sleeve and the plug and between the rotatable sleeve and the packing nut.

6. A blow out preventer, as claimed in claim 5, the packing between the rod and rotatable sleeve comprising a packing tube, resilient packing rings above and below the packing tube, solid packing rings on the outside of the resilient packing rings, and packing nuts threaded on the inside of the rotatable sleeve.

7. A blow out preventer, as claimed in claim 5, the packing between the plug and the rotatable sleeve comprising packing rings and a packing nut threaded into a bore on the said plug.

8. A blow out preventer, as claimed in claim 5, the packing between the rotary sleeve and the packing nut comprising an upper extension of the packing nut having the upper bearing therein, packing rings between said extension and the rotary sleeve, and a packing nut threaded internally of the said upper extension.

9. A blow out preventer comprising in combination a casing head structure adapted to be secured to a well casing, a plug fitted therein, a bearing structure, a packing between the bearing structure, the plug and the casing head, a rotatable sleeve having a rotatable bearing on the said bearing structure, a rotatable rod, means connecting the rod and the rotatable sleeve, and a packing between the plug and the sleeve.

10. A blow out preventer, as claimed in claim 9, a packing nut secured to the said bearing structure, means forming a bearing engagement between the sleeve and the said packing nut, and a packing between the rotary sleeve and the said packing nut.

In testimony whereof I have signed my name to this specification.

LESTER M. CRANS.